(12) United States Patent
Nakagawa et al.

(10) Patent No.: US 6,427,472 B1
(45) Date of Patent: Aug. 6, 2002

(54) AIR CONDITIONER FOR A VEHICLE

(75) Inventors: Tadashi Nakagawa, Nishikamo-gun; Takayoshi Matsuno, Okazaki, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/282,422

(22) Filed: Mar. 31, 1999

Related U.S. Application Data

(63) Continuation of application No. PCT/JP97/03505, filed on Oct. 1, 1997.

(30) Foreign Application Priority Data

Oct. 1, 1996 (JP) ............................................. 8-261016
Jan. 16, 1997 (JP) ............................................. 9-005709

(51) Int. Cl.⁷ .............................................. B60H 1/32
(52) U.S. Cl. ...................... 62/430; 62/229; 62/323.1; 165/42
(58) Field of Search .................. 62/133, 134, 229, 62/243, 244, 430; 165/42, 43

(56) References Cited

U.S. PATENT DOCUMENTS 2,962,873 A * 12/1960 Anderson ..................... 62/180
5,277,038 A * 1/1994 Carr ............................. 62/434
5,497,941 A * 3/1996 Numazawa et al. ........ 237/2 A
5,755,303 A * 5/1998 Yamamoto et al. ........ 180/65.2

FOREIGN PATENT DOCUMENTS

| JP | 58-211906 | 12/1983 |
| JP | 59-114106 | 7/1984 |
| JP | 61-150818 | 7/1986 |
| JP | 63-9023 | 1/1988 |
| JP | 63-35843 | 9/1988 |
| JP | 3-266765 | 11/1991 |
| JP | 4-126628 | 4/1992 |
| JP | 5-328521 | 12/1993 |
| JP | 6-4344 | 1/1994 |
| JP | 6-156062 | 6/1994 |
| JP | 6-286459 | 10/1994 |
| JP | 8-98318 | 4/1996 |
| JP | 8-142642 | 6/1996 |

* cited by examiner

Primary Examiner—William Doerrler
Assistant Examiner—Melvin Jones
(74) Attorney, Agent, or Firm—Pillsbury Madison & Sutro LLP

(57) ABSTRACT

There is provided an air conditioner for a vehicle, which comprises a refrigerating cycle having a compressor (20), a water cooling cycle formed by a radiator (36) and a heat storage tank (50), which are switched by passage switching valves (46) and (48), and a water heating cycle formed by a heater core (38) and the heat storage tank (50). As a result, when an engine is being driven, heat for cooling or heating is stored in the heat storage tank (50) by the water cooling cycle or the water heating cycle, and when an engine (14) is in a stopped state, the heat stored in the heat storage tank (50) is used to allow cooling or heating

3 Claims, 8 Drawing Sheets

AIR CONDITIONER FOR A VEHICLE

This application is a Continuation of PCT/JP97/03505 filed Oct. 1, 1997.

FIELD OF THE INVENTION

The present invention relates to an air conditioner for a vehicle, which is used in a vehicle having, as a power source for driving the vehicle, an engine or both an engine and an electric motor.

BACKGROUND ART

In recent years, a hybrid car has been proposed in which an electric motor which electrically produces driving force is provided in addition to an engine which produces driving force by combusting fuel such as gasoline. In this hybrid car, even if the engine is stopped, the electric motor is driven by electric power supplied from a battery, which has been previously charged or which is charged by power generated by the engine during traveling, so as to drive the hybrid car.

On the other hand, even in an air conditioner provided in this type of hybrid car, it is necessary that a compressor be driven when air-conditioning the vehicle interior. For this reason, as disclosed in Japanese Patent Application Laid-Open (JP-A) No. 6-286459, the engine is started by operating a switch of an air conditioner when the engine is stopped, and a compressor is driven by the driving force of the engine.

As a result, a motor used only for driving a compressor of an air conditioner becomes unnecessary, and the air conditioner can be operated without using the driving force of an electric motor or the electric power of a battery to operate the electric motor.

However, in the above-described structure, it is necessary that the engine be started when operating the air conditioner. As a result, there exist drawbacks in that the driving force of the engine is used only for driving the compressor, which results in deterioration in fuel consumption, and the efficiency of utilization of power is also extremely low.

Accordingly, in view of the above-described circumstances, an object of the present invention is to provide an air conditioner for a vehicle, which allows air conditioning by efficiently utilizing the driving force of an engine or the driving force of an engine and an electric motor without providing driving means used only for driving a compressor.

DISCLOSURE OF THE INVENTION

The present invention is an air conditioner for a hybrid car, which is provided in a hybrid car equipped with an engine and an electric motor for running and which air conditions a vehicle interior by a refrigerating cycle formed to include a compressor and an evaporator and also by circulation of engine cooling water to heat dissipation means for heating, comprising: heat exchange means provided in the refrigerating cycle to cool water; heat storage means in which one of cooling heat of water cooled by said heat exchange means and heating heat of water heated by cooling the engine is accumulated; heat dissipation means for cooling, which cools air to be blown out into the vehicle interior by water to be supplied, as a refrigerant, from said heat storage means; a first circulating passage which circulates, to said heat storage means, engine cooling water circulated between the engine and said heat dissipation means for heating; a second circulating passage which circulates water, serving as a refrigerant, between said heat storage means, said heat dissipation means for cooling, and said heat exchange means; and switching means in which one of said first and second circulating passages is selected by switching and one of heat storage and heat dissipation for said heat storage means is carried out by water circulated through one of said first and second circulating passages.

As a result, when the engine is driven during cooling, the compressor is driven by the driving force of the engine to allow cooling. At this time, water is cooled by the refrigerating cycle and cooling heat of the water is accumulated in the heat storage means. Subsequently, while the engine is stopped or when the vehicle is being run by the driving of an electric motor, water is circulated from the heat storage means to the heat dissipation means for cooling so as to allow cooling of the air to be blown out into a vehicle interior.

Further, during heating, cooling water heated by the engine when being driven is used to allow heating, and the heat of the cooling water is accumulated in the heat storage means. Further, when the engine is stopped, water is circulated from the heat storage means to the heat dissipation means for heating so as to allow heating of the air to be blown out into the vehicle interior.

The switching means effects switching between storage of cooling heat and storage of heating heat by the heat storage means.

As a result, it is possible to heat and cool the vehicle interior without driving the compressor and it is not necessary that the engine be started to drive the compressor. For this reason, deterioration of fuel consumption can be prevented. Further, driving means such as a motor for driving the compressor while the engine is stopped becomes unnecessary.

By providing both the water cooling cycle and the water heating cycle, heating and cooling can be carried out according to a vehicle occupant's preference. Further, it is also possible to heat the vehicle interior while carrying out dehumidification, without operating the compressor.

The determination as to whether the heat storage means is used as a heat source for heating or a heat source for cooling may be made in accordance with the operating state of the air conditioner or environmental conditions such as the outside air temperature, the vehicle-interior temperature, and the like. For example, when the cooling operation is carried out by the air conditioner, there is a high possibility of the cooling operation being continuously carried out. For this reason, the operation may be switched to the second circulating means so that the heat storage means serves as the heat source for cooling. Further, when the outside air temperature is low in the winter or the like, there is a high possibility the heating operation will be carried out, and therefore, the first circulating means may be used to allow the circulation of water (engine cooling water), serving as a refrigerant, to the heat storage means.

Meanwhile, not only the heat storage means, but the heat dissipation means for heating and the heat dissipation means for cooling may be used in common with each other. In this case, during heat storage, only the circulating means needs to be switched between heating and cooling, and at the time of heat dissipation (heating or cooling), water serving as a refrigerant only needs to be supplied from the heat storage means to the heat dissipation means. As a result, heating or cooling can be carried out in accordance with the heat accumulated in the heat storage means. Accordingly, the structures of the water cooling cycle and the water heating cycle can be simplified.

Further, the present invention is an air conditioner for a hybrid car, which is provided in a hybrid car equipped with an engine and an electric motor for running and which air conditions a vehicle interior by a refrigerating cycle formed to include a compressor and an evaporator, comprising: driving shafts provided respectively in the engine and in the electric motor; an output shaft connected to the driving shafts of the engine and the electric motor and rotated synchronously with a driving source which is one of the engine and the electric motor; load reduction means for reducing the driving load of said output shaft which rotates integrally with the driving shaft of the engine when the electric motor is driven; and driving force transmitting means which connects said output shaft and the driving shaft of the compressor to transmit the driving force of said output shaft to the compressor.

According to the above-described structure, when the electric motor is driven, a load for rotating the driving shaft of the engine connected to the output shaft of the electric motor is reduced by the driving load reduction means and the compressor is driven by remaining power.

In the present invention as described above, the above-described load reduction means is valve opening means for opening a valve while the engine is stopped.

Generally, when the driving shaft of the engine in a stopped state is rotated, air within a cylinder of the engine must be compressed, and therefore, a driving load is extremely high. Accordingly, in order to rotate the driving shaft of the engine, an extremely large driving force is required. On the other hand, so long as the driving load reduction means operates so as to, for example, open a valve which allows air supply and exhaust for a cylinder of the engine or open a throttle valve which opens and closes a passage of air to be supplied into the cylinder of the engine, compression of air within the cylinder of the engine or increase in air-intake resistance can be prevented, thereby allowing reduction of a load for rotating the driving shaft.

As described above, so long as the load for rotating the output shaft when the engine is stopped is reduced by the driving load reduction means, the compressor can be driven by using the driving force of the electric motor. In this case, in the same way as the aforementioned, it is not necessary to provide driving means used only for driving the compressor and it is also not necessary to start the engine to drive the compressor. For this reason, consumption of fuel caused by driving the engine can be restrained.

Moreover, the present invention is an air conditioner for a hybrid car, which is provided in a hybrid car equipped with an engine and an electric motor for running and which air conditions a vehicle interior by a refrigerating cycle formed to include a compressor and an evaporator, comprising: an auxiliary-machine motor which drives a plurality of auxiliary machines provided in the hybrid car; second driving force transmitting means which can transmit the driving force of the engine and the driving force of said auxiliary-machine motor to the plurality of auxiliary machines and also to the driving shaft of the compressor; driving force interrupting means which separates the driving shaft of the engine and said second driving force transmitting means from each other; and control means which separates the driving shaft of the engine and said second driving force transmitting means from each other by said driving force interrupting means when the engine is stopped and allows the plurality of auxiliary machines including the compressor to be driven by said auxiliary-machine motor.

As a result, when the engine is driven, the driving force of the engine is transmitted by the second driving force transmitting means to auxiliary machines including the compressor. Further, when the engine has been stopped, the driving shaft of the engine and the second driving force transmitting means are separated from each other by the driving force interrupting means and the compressor is driven by the driving force of the auxiliary-machine motor.

Accordingly, when the engine is stopped, the compressor can be driven by the auxiliary-machine motor in the same way as in other auxiliary machines provided in the hybrid car, and when the engine is being driven, the auxiliary machines including the compressor can be driven by the driving force of the engine.

BEST MODES FOR CARRYING OUT THE INVENTION

An air conditioner for a vehicle according to the present invention will be hereinafter described in detail with reference to the attached drawings.

(First Embodiment)

Figure 1:
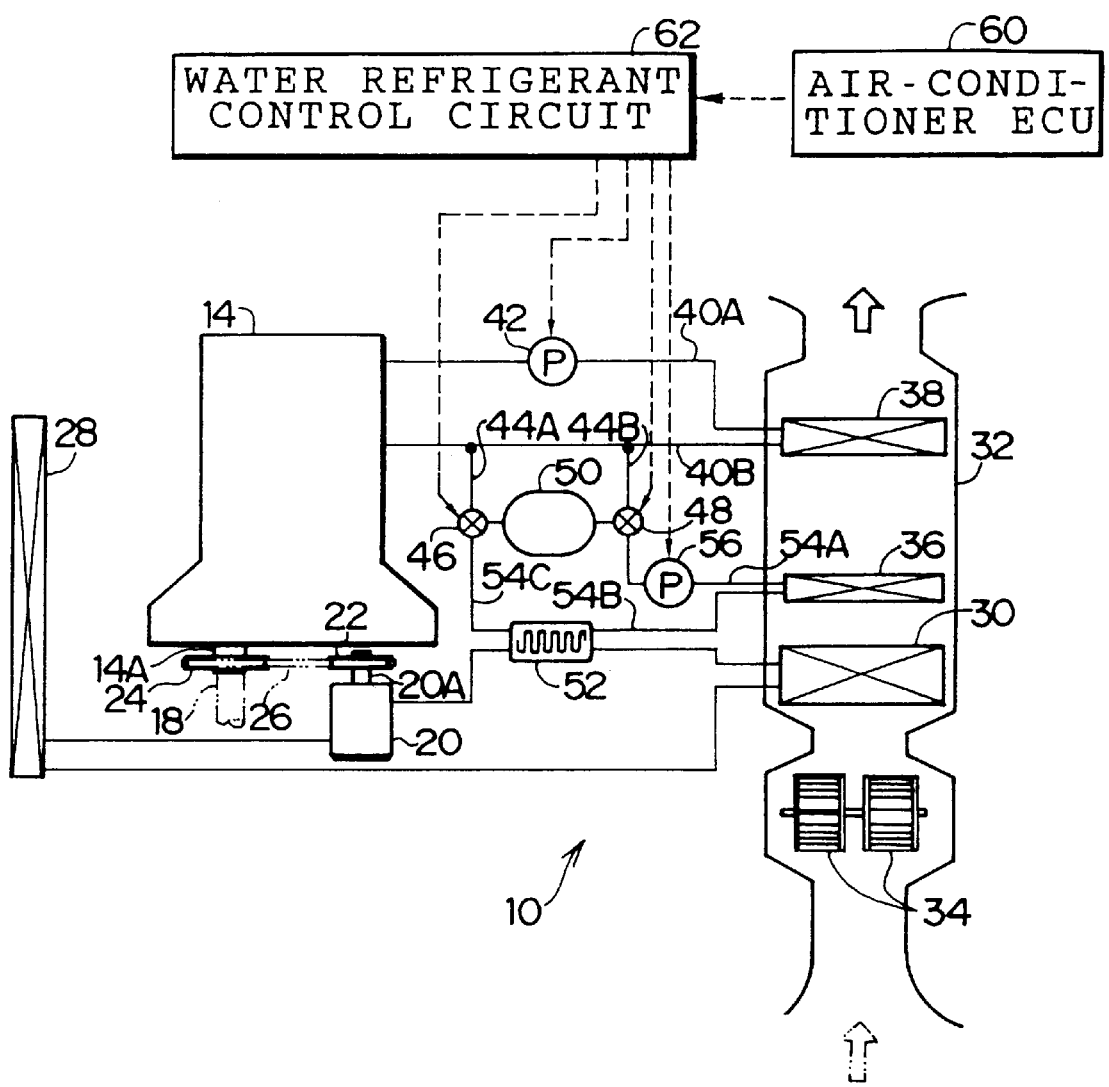
FIG. 1 is a schematic structural diagram of an air conditioner according to a first embodiment.
Figure 2:
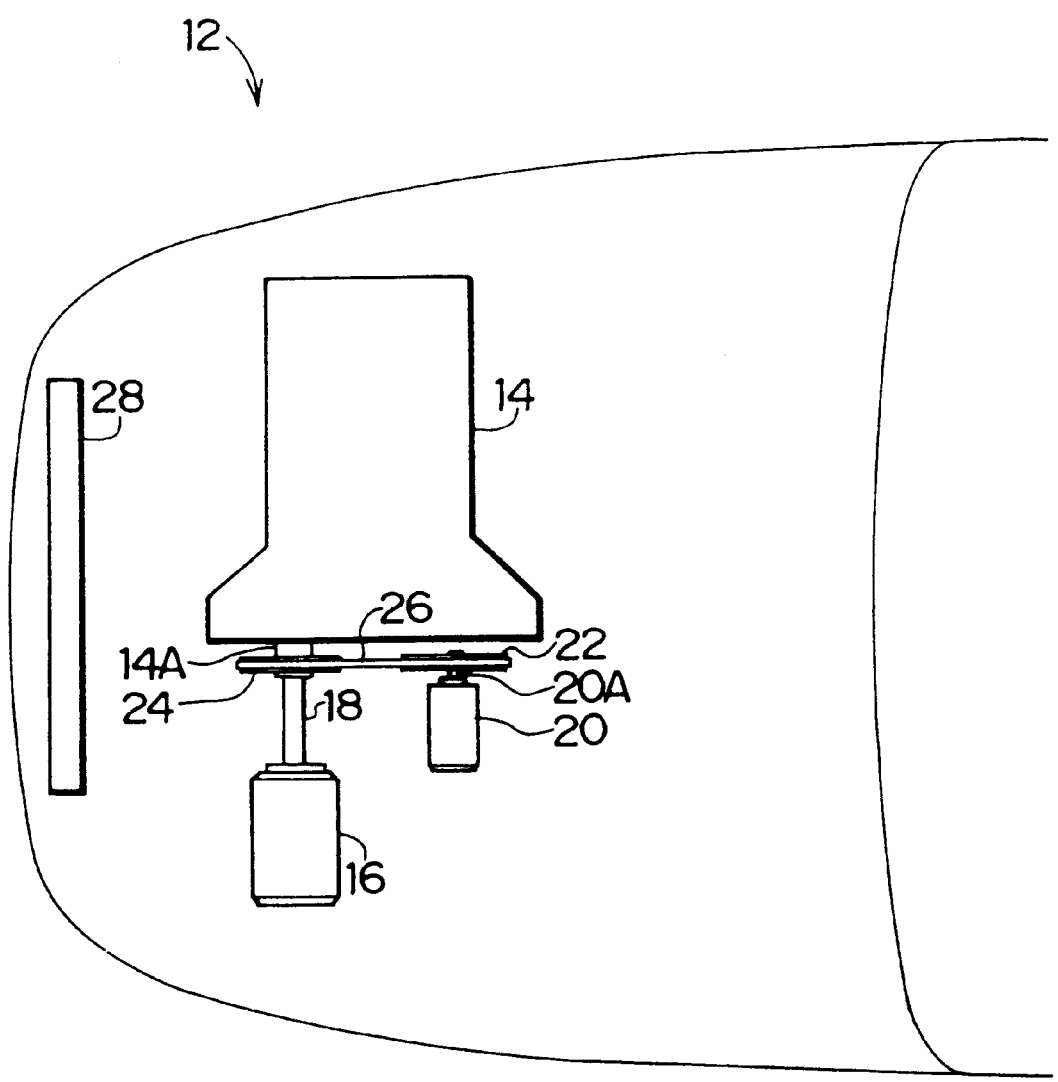
FIG. 2 is a schematic structural diagram which shows the arrangement of an engine and an electric motor of a hybrid car applied to the first embodiment.

FIG. 1 shows a schematic structure of an air conditioner for a vehicle (hereinafter referred to as "air conditioner 10") applied to a first embodiment. FIG. 2 schematically shows a portion of a hybrid car 12, which is an example of a vehicle equipped with the air conditioner 10.

As shown in FIG. 2, the hybrid car 12 equipped with the air conditioner 10 includes, as a power source for traveling, an electric motor 16 in addition to an engine 14. The electric motor 16 and the engine 14 are each connected to an output shaft 18 directly or indirectly. In FIG. 2, as an example, the output shaft 18 is connected to the electric motor 16 so that a driving shaft of the electric motor 16 becomes the output shaft 18, and a driving shaft 14A of the engine 14 is connected to the output shaft 18. As a result, the output shaft 18 is driven to rotate by the engine 14 or the electric motor 16. The electric motor 16 is driven by electric power supplied from, for example, a previously charged battery (not shown) mounted before traveling.

The hybrid car 12 is provided with the compressor 20 disposed adjacent to the engine 14. A pulley 22 is mounted to a driving shaft 20A of the compressor 20 and an endless V belt 26 is entrained between the pulley 22 and a pulley 24 mounted to the driving shaft 14A of the engine 14. When the engine 14 is started, driving force is transmitted via the V belt 26 to the compressor 20.

As shown in FIG. 1, in the air conditioner 10, a refrigerating cycle is formed by a circulating passage of a refrigerant including the compressor 20, a capacitor 28, and an evaporator 30. A refrigerant liquefied by being compressed by the compressor 20 is supplied to the evaporator 30, and when the refrigerant is decompressed to be vaporized, air to be blown out into a vehicle interior is cooled.

The pressure of the refrigerant supplied to the evaporator 30 is adjusted by controlling the capacity of the compressor 20. Further, water in the cooled air is applied to the evaporator 30 by dew condensation, and in the air conditioner 10, not only at the time of a cooling operation, but also at the time of a heating operation, a dehumidifying operation can be effected by operating the compressor 20 at a predetermined capacity.

The evaporator 30 is provided within an air-conditioning duct 32. The air-conditioning duct 32 is provided with blower fans 34. Outside air or air within a vehicle interior is sucked into the air-conditioning duct 32 and is blown toward the evaporator 30, and the blown air is cooled by the evaporator 30 which is cooled by the circulating refrigerant, thereby allowing dehumidification.

The air-conditioning duct 32 is provided with a heat-regenerative radiator (hereinafter referred to as "radiator 36") and a heater core 38, which are disposed adjacent to the evaporator 30. Air passing through the evaporator 30 further passes through the radiator 36 and the heater core 38 and is blown out from a blowout hole (not shown) into the vehicle interior.

A pair of hot-water pipes 40A and 40B are connected to the heater core 38 between the engine 14 and the heater core 38. An electrically operated pump 42 is provided at an intermediate portion of one hot-water pipe 40A. Driving the electrically operated pump 42 allows cooling water for the engine 14 to be supplied to the heater core 38. The heater core 38 heats air passing through the heater core 38 with the cooling water serving as a refrigerant (the cooling water will be hereinafter referred to as "water refrigerant").

The other hot-water pipe 40B connected to the heater core 38 is branched off by a pair of branch pipes 44A and 44B. These branch pipes 44A, 44B are respectively provided with passage switching valves 46 and 48 in a pair. A heat storage tank 50 is connected to and between these passage switching valves 46 and 48. With the heat storage tank 50 communicating with the hot-water pipe 40B via the branch pipes 44A and 44B due to the operation of the passage switching valves 46 and 48, a water refrigerant circulated while being heated by the engine 14 is supplied to the heat storage tank 50.

The heat storage tank 50 is filled with a heat accumulating material surrounded by a heat insulating material. With the water refrigerant circulated between the heat storage tank 50 and the engine 14 passing through the heat storage tank 50, the heat accumulating material is heated by the water refrigerant. The heat storage tank 50 is maintained with the temperature of the heat accumulating material being kept by the heat insulating material. Further, when, while the engine 14 is stopped, the electrically operated pump 42 is operated to allow the water refrigerant to be supplied to the heat core 38 to pass through the heat storage tank 50, the water refrigerant is heated due to heat exchange effected between the water refrigerant and the heat accumulating material. As a result, a water heating cycle is formed in which, even when the engine 14 is in a stopped state, air passing through the heater core 38 is heated to allow the vehicle interior to be heated.

On the other hand, a water-refrigerant heat exchanger 52 is mounted between the evaporator 30 and the compressor 20, which form the refrigerating cycle. The water-refrigerant heat exchanger 52 is cooled in such a manner that a refrigerant passing through the evaporator 30 is supplied to the water-refrigerant heat exchanger 52 and is further decompressed.

A pair of cold-water pipes 54A and 54B are connected to the radiator 36. One cold-water pipe 54B is connected to the water-refrigerant heat exchanger 52. The other cold-water pipe 54B is connected to the passage switching valve 48 and an electrically operated pump 56 is mounted at an intermediate portion of the other cold-water pipe 54B. Further, the water-refrigerant heat exchanger 52 is connected to the passage switching valve 46 by a cold-water pipe 54C. When the passage is switched to the heat storage tank 50 by the passage switching valves 46 and 48, a circulating passage for circulating the water refrigerant between the heat storage tank 50, the water-refrigerant heat exchanger 52, and the radiator 36 is formed.

As a result, when the electrically operated pump 56 is operated to allow circulation of the water refrigerant, and the water refrigerant passes through the water-refrigerant heat exchanger 52, the cooled water refrigerant is supplied to the heat storage tank 50. The heat storage tank 50 allows the heat accumulating material to be cooled when the water refrigerant passes through the heat storage tank 50. Further, when the water refrigerant passing through the heat storage tank 50 is supplied to the radiator 36 by the operation of the electrically operated pump 56, the water refrigerant is cooled by the heat accumulating material within the heat storage tank 50. As a result, a water cooling cycle is formed in such a manner that the water refrigerant cooled in the heat storage tank 50 is supplied to the radiator 36 and air within the air-conditioning duct 32, passing through the radiator 36, is cooled.

The air conditioner 10 includes an air-conditioner ECU 60 which controls air conditioning. The air-conditioner ECU 60 has a general structure in which, by controlling each operation of the compressor 20, the blower fans 34, and the like in accordance with an operating state of an unillustrated operation panel (setting of an operating condition) while detecting the outside air temperature, the indoor air temperature, and the like, air for a cooling/heating operation or a dehumidifying operation is blown out into the vehicle interior and the vehicle interior is thereby maintained in a desired air-conditioned state. Detailed illustration and description of the structure of the air-conditioner ECU 60 will be omitted.

The air conditioner 10 also includes a water-refrigerant control circuit 62. The water-refrigerant control circuit 62 is connected to the air-conditioner ECU 60 and also to an engine ECU (not shown) for controlling the engine 14. Further, the passage switching valves 46 and 48 and the electrically operated pumps 42 and 56 are each connected to the water-refrigerant control circuit 62.

Signals corresponding to an operating state of the air conditioner 10 and environmental conditions such as the outside air temperature, the indoor air temperature, and the like are inputted from the air-conditioner ECU 60 to the water-refrigerant control circuit 62. Further, a signal which indicates an operating state of the engine 14 is inputted from the engine ECU. The water-refrigerant control circuit 62 controls the passage switching valves 46 and 48 and the electrically operated pumps 42 and 56 based on the various signals.

Next, the operation of the first embodiment will be described with reference to the flow charts shown in FIGS. 3 and 4. These flow charts each show an example of the operation of the water-refrigerant control circuit 62.

Figure 3:
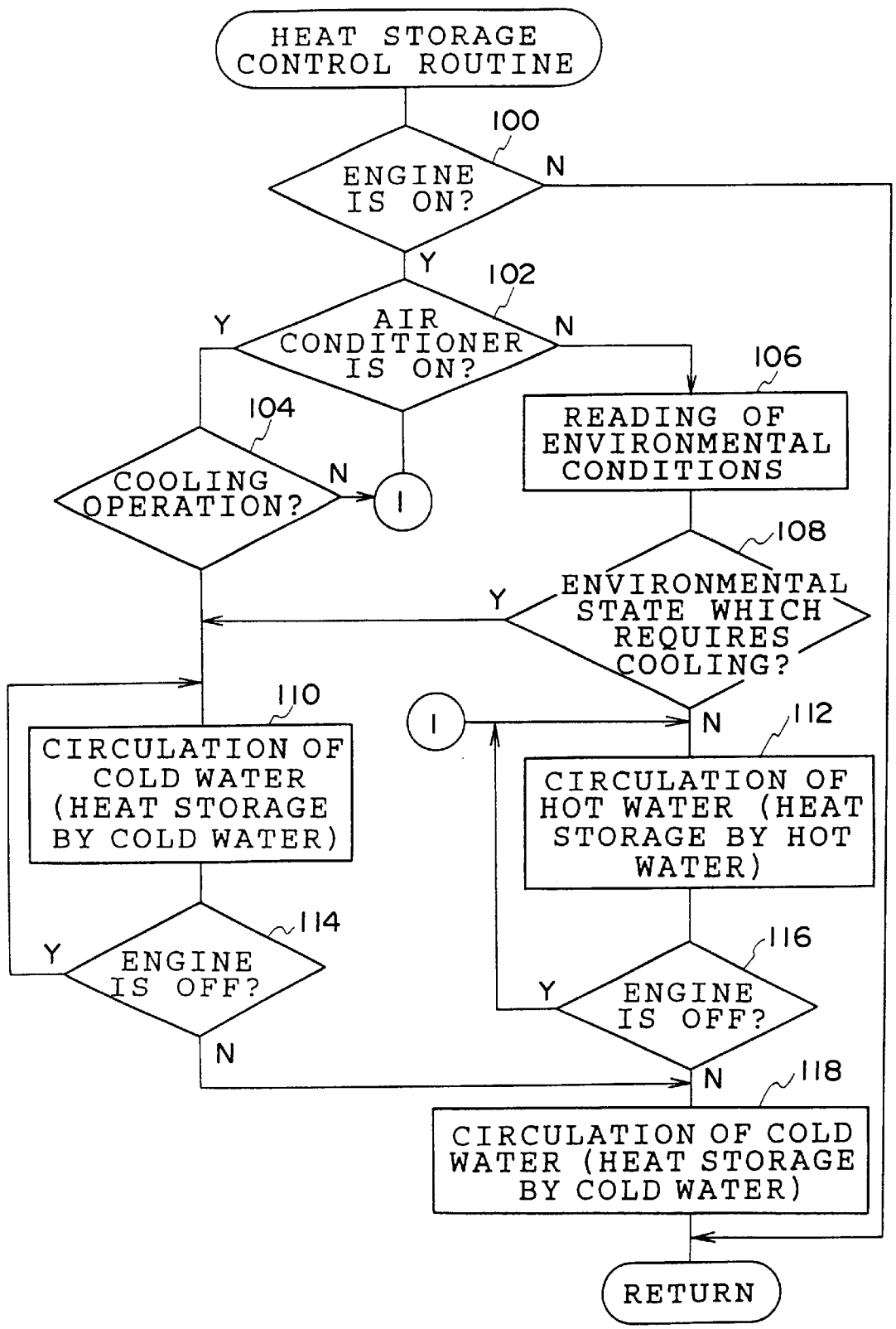
FIG. 3 is a flow chart which shows an example of heat storage processing.

The flow chart shown in FIG. 3 shows an example of heat storage processing for the heat storage tank 50. In the first step 100, it is ascertained whether the engine 14 has been started (switched on), i.e., whether the hybrid car 12 is traveling using the engine 14. When it is determined that the engine 14 has been started, the process proceeds to step 102. In step 102, it is ascertained whether the air conditioner 10 is switched on.

When the air conditioner 10 is switched on (when the decision of step 102 is affirmative), the process proceeds to step 104, in which it is ascertained whether the air conditioner 10 is operating in a cooling mode or a heating mode. Further, when the air conditioner 10 is not switched on (when the decision of step 102 is negative), the process proceeds to step 106, in which environmental conditions such as the outside air temperature are measured. In step 108, it is determined from the measured environmental conditions such as the outside air temperature whether the possibility is of the air conditioner 10 being operated in a cooling mode or in a heating mode. For example, in the summer period in which the outside air temperature or the indoor temperature is high, there is a high possibility of the air conditioner 10 being operated in a cooling mode. In the winter period in which the outside air temperature or the indoor temperature is low, there is a high possibility of the air conditioner 10 being operated in a heating mode. Consequently, it can be determined whether the possibility is of the air conditioner 10 being operated in a cooling mode or in a heating mode from a determination about whether the outside air temperature or the indoor temperature exceeds a previously set value.

As described above, when the air conditioner 10 is operated in the cooling mode (when the decision of step 104 is affirmative) or when there is a possibility of the air conditioner 10 being operated in the cooling mode (when the decision of step 108 is affirmative), the process proceeds to step 110, in which, by operating the passage switching valves 46 and 48, the heat storage tank 50 is connected to the cold-water pipes 54B and 54C and the electrically operated pump 56 is operated. As a result, circulation of the water refrigerant between the water-refrigerant heat exchanger 52 and the heat storage tank 50 is started.

When the engine 14 has been started, the driving force of the engine 14 is transmitted via the V belt 26 to the compressor 20 and the driving shaft 20A of the compressor 20 is thereby rotated. As a result, the refrigerant compressed and discharged from the compressor 20 is supplied to the water-refrigerant heat exchanger 36 and the water refrigerant circulated in the water- refrigerant heat exchanger 36 is cooled. The water refrigerant cooled by the water-refrigerant heat exchanger 36 is transferred to the heat storage tank 50 to cool the heat accumulating material within the heat storage tank 50. As a result, heat for a cooling operation is stored in the heat storage tank 50.

When the air conditioner 10 is operated in the heating mode (when the decision of step 104 is negative) or when there is a possibility of the air conditioner 10 being operated in the heating mode (when the decision of step 108 is negative), the process proceeds to step 112, in which by operating the passage switching valves 46 and 48, the heat storage tank 50 is connected to the branch pipes 44A and 44B branched off from the hot-water pipe 40B and the electrically operated pump 42 is operated. As a result, circulation of the water refrigerant heated by the engine 14 is started and the heated water refrigerant is supplied from the engine 14 to the heat storage tank 50. When the water refrigerant placed in a high-temperature state by cooling the engine 14 passes through the heat storage tank 50 from the engine, the heat accumulating material in the heat storage tank 50 is heated to allow storage of heat for the heating operation.

The heat storage operation in the heat storage tank 50 is continuously carried out until it is determined that the engine 14 has been stopped in step 114 or in step 116. When the engine 14 is stopped, in step 118, the passage switching valves 46 and 48 may be closed to prevent outflow of the water refrigerant from the heat storage tank 50, and the like. Further, the time of completion of the heat storage operation in the heat storage tank 50 may be set, for example, for when the temperature of the heat accumulating material in the heat storage tank 50, which is detected by a temperature sensor or the like, reaches a predetermined temperature, or when the change in the temperature is reduced to nothing.

Figure 4:
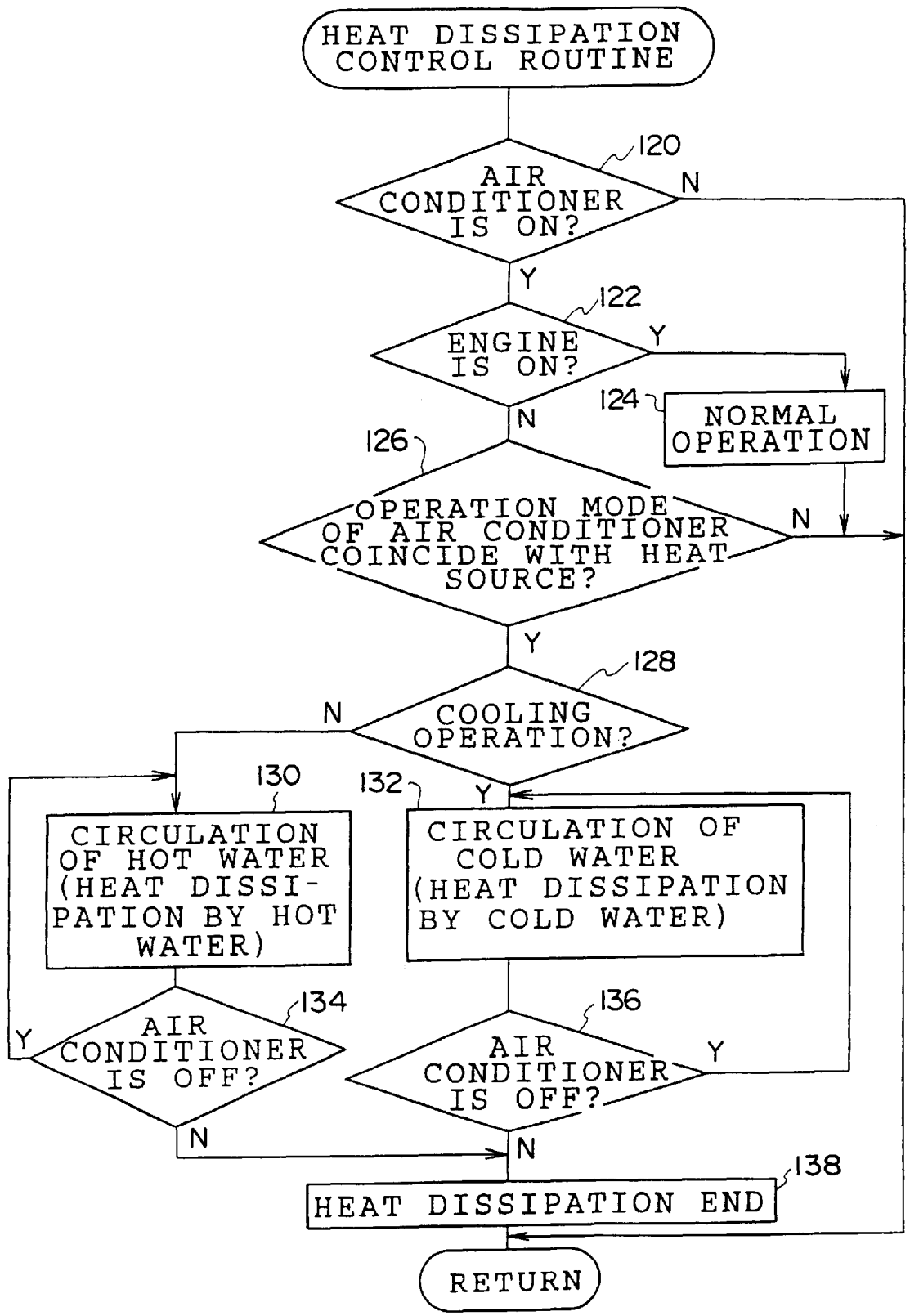
FIG. 4 is a flow chart which shows an example of heat dissipation processing.

FIG. 4 shows an example in which the heat storage tank 50 is used as a heat source for heating or air-cooling. In the first step 120 in this flow chart, it is ascertained whether the air conditioner 10 is switched on. Further, in the subsequent step 122, it is ascertained whether the engine 14 is started (switched on).

When the engine 14 is started, a normal air-conditioning operation is allowed in which the heat of cooling water for the engine 14 and the compressor 20 to be driven by the engine 14 are used. Accordingly, when the decision of step 122 is affirmative, the process proceeds to step 124, in which the normal operation of the air conditioner 10 is started.

On the other hand, when the air conditioner 10 is switched on (when the decision of step 120 is affirmative) and when the engine 14 is in a stopped state (when the decision of step 122 is negative), the process proceeds to step 126, in which it is ascertained whether the air conditioner 10 can be operated with the heat storage tank 50 serving as the heat source. When the operation mode of the air conditioner 10 and heat stored in the heat storage tank 50 coincide with each other, namely, when the air conditioner 10 is set in a cooling mode in a state in which heat for air-cooling is stored in the heat storage tank 50 and when the air conditioner 10 is set in a heating mode in a state in which heat for heating is stored in the heat storage tank 50, the decision of step 126 is made affirmative, and the process proceeds to step 128.

When the air conditioner 10 is set in the heating mode and the heat source for heating is provided in the heat storage tank 50, the decision of step 128 is made negative and the process proceeds to step 130. As a result, the passage switching valves 46 and 48 are operated to allow connection between the heat storage tank 50 and each of the branch pipes 44A and 44B, and further, the electrically operated pump 42 is actuated to start circulation of the water refrigerant between the heat storage tank 50 and the heater core 38. The circulated water refrigerant is heated by the heat accumulating material as it passes through the heat storage tank 50 and is transferred to the heater core 38. The water refrigerant transferred to the heater core 38 heats air which passes through the heater core 38 within the air-conditioning duct 32. As a result, heated air is blown out from the air-conditioning duct 32 to allow the vehicle interior to be heated.

On the other hand, when the air conditioner 10 is set in the cooling mode, the decision of step 128 is affirmative and the process proceeds to step 132. As a result, the passage switching valves 46 and 48 allow connection between the heat storage tank 50 and each of the cold-water pipes 54B and 54C, and further, the electrically operated pump 56 is actuated to start circulation of the water refrigerant between the heat storage tank 50 and the radiator 36. The water refrigerant transferred from the heat storage tank 50 to the radiator 36 due to the operation of the electrically operated pump 56 is cooled by the heat accumulating material in the heat storage tank 50 as it passes through the heat storage tank 50 and is further transferred to the radiator 36. The water refrigerant supplied to the radiator 36 allows the cooling of air passing through the radiator 36. As a result, air cooled by the radiator 36 is blown out into the vehicle interior and air-cooling for the vehicle interior is achieved.

The cooling or heating operation using the heat storage tank 50 is continuously carried out based on the confirmation that the air conditioner 10 was switched on in step 134 or in step 136. When the air conditioner 10 is switched off, the process proceeds to step 138, in which the process ends by the electrically operated pump 42 or the electrically operated pump 56 being stopped. When the flow chart is being executed, the water-refrigerant control circuit 62 monitors to determine whether the engine 14 has been started. When the engine 14 is started, heating and air-cooling with the heat storage tank 50 used as the heat source is stopped and the heat storage operation in the heat storage tank 50 is started again.

As described above, the air conditioner 10 is constructed in such a manner that, when the engine 14 is started, heat for air conditioning is stored in the heat storage tank 50, and when the air conditioner 10 is operated in the state in which the engine 14 has been stopped, cooling or heating for the vehicle interior is effected by the heat stored in the heat storage tank 50. For this reason, even when the engine 14 is stopped, the vehicle interior is able to be air-conditioned. Further, it is not necessary to provide a power source used only for operating the compressor 20 which effects air conditioning for the vehicle interior when the engine 14 is in a stopped state, and there is no possibility of the electrically operated motor 16 being actuated to operate the compressor 20. For this reason, no extra large load is applied to the battery.

Meanwhile, in the first embodiment, heat for cooling or heating is stored in the heat storage tank 50 by switching the circulating passage of the water refrigerant for the heat storage tank 50 by the passage switching valves 46 and 48. However, separate heat storage tanks may be respectively provided for the heating and cooling operations. As a result, either of the cooling and heating operations can be selected irrespective of environmental conditions and the like, so as to allow air conditioning (cooling and heating) according to a vehicle occupant's preference.

Further, the heat storage tank 50 is not limited to a structure which stores heat in the heat accumulating material. For example, a structure in which a heated or cooled water refrigerant is stored and the stored water refrigerant is released as occasion demands may be used. Further, there can also be used other various structures which each allow efficient heat storage and heat dissipation.

In the first embodiment, there was described a structure in which the water-refrigerant control circuit 62 is provided separately from the air-conditioner ECU 60, but the air-conditioner 60 may be provided to serve as the water-refrigerant control circuit 62.

(Second Embodiment)

Next, a second embodiment of the present invention will be described.

Figure 5:
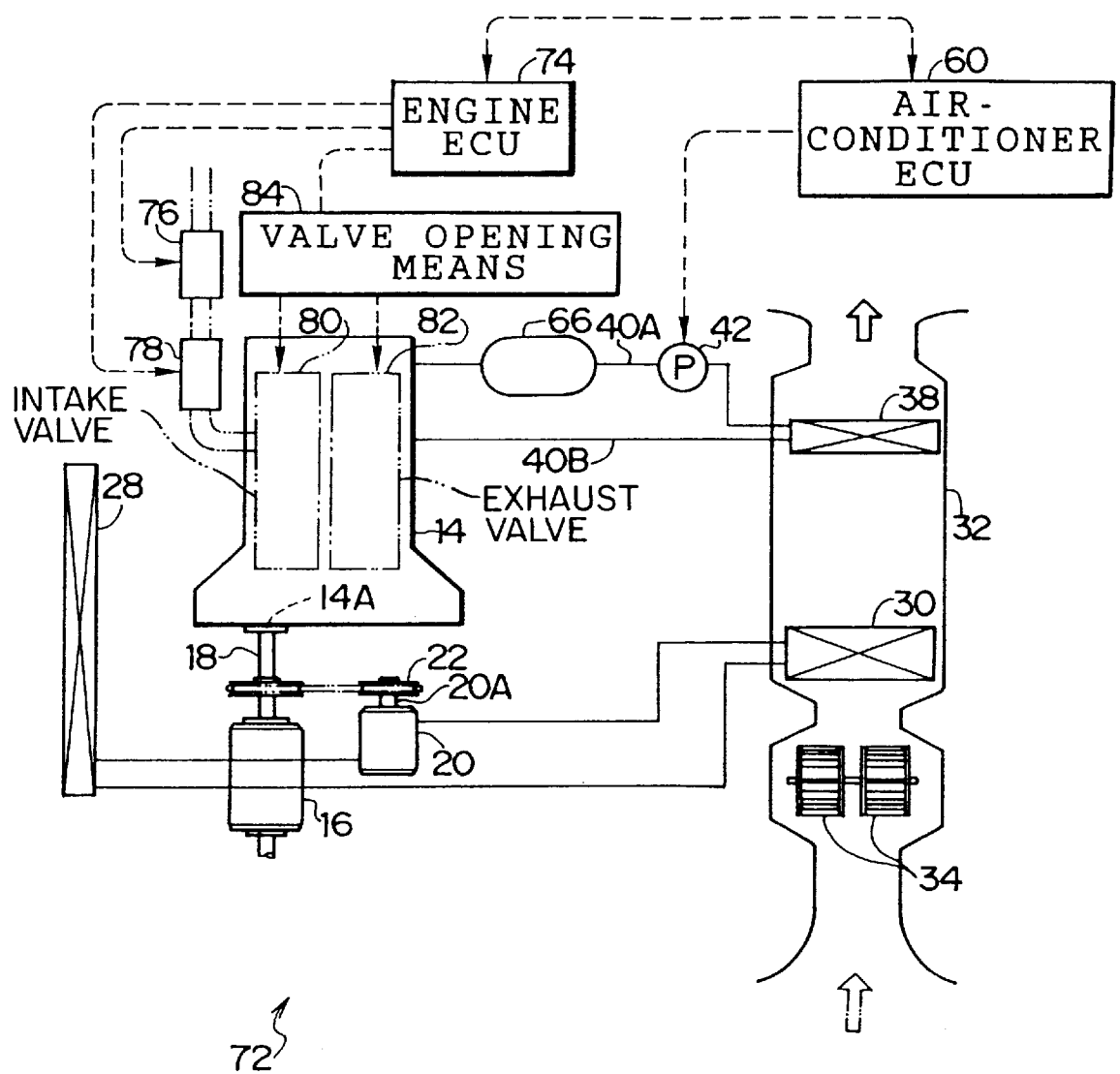
FIG. 5 is a schematic structural diagram of a hybrid car and an air conditioner according to a second embodiment.

As shown in FIG. 5, an air conditioner 72 applied to the fourth embodiment allows heating by using heat of the engine 14 when the engine 14 is driven. Further, when the engine 14 is stopped, heating can be effected by using heat of the engine 14 stored in the heat storage tank 66 when the electrically operated pump 42 is actuated to drive the engine 14.

Further, the compressor 20 of the air conditioner 72 is rotated due to the driving force from the output shaft 18 to which the engine 14 and the electric motor 16 are each connected.

An engine ECU 74 which controls the operation of the engine 14 is connected to the air-conditioner ECU 60. The engine ECU 74 is generally structured to operate based on a conventional publicly-known engine control method to control the engine 14. In the present embodiment, only the structure relating to the present invention will be described herein.

A throttle valve 76 and a fuel injector 78 are each connected to the engine ECU 74. The throttle valve 76 is operated in accordance with an operation of an accelerator pedal (not shown) and the fuel injector 78 is actuated in accordance with the opening of the throttle valve 76 and the operating state of the engine 14. As a result, the proper amounts of both air and fuel are supplied to each cylinder of the engine 14.

The engine 14 is provided with valve opening means 84 which opens an intake valve 80 and an exhaust valve 82. The valve opening means 84 is connected to the engine ECU 74, and based on an operation signal from the engine ECU 74, the valve opening means 84 opens the intake valve 80 and the exhaust valve 82.

Generally, when the intake valve 80 and the exhaust valve 82 are opened and the throttle valve 76 is brought into a full-open state, the intake/exhaust resistance when the piston is moving reciprocally in a cylinder is reduced in the engine 14. As a result, the friction for rotating the driving shaft 14A when the engine 14 is in a stopped state is reduced and the driving shaft 14A of the engine 14 can be rotated by a small driving force.

In the air conditioner 72 structured as described above, when the engine 14 is stopped at the time of the cooling or dehumidifying operation, and the cooling or dehumidifying operation is indicated while the electric motor 16 is being driven (cooling or dehumidification is set by an unillustrated operation panel), a valve opening signal is outputted to the engine ECU 74. When the valve opening signal is inputted to the engine ECU 74, the throttle valve 76 is brought into a full-open state and the intake valve 80 and the exhaust valve 82 are opened. At this time, the injection of fuel from the fuel injector 78 is, of course, prohibited. Further, the opening of the throttle valve 76, the intake valve 80, and the exhaust valve 82 may be carried out not only at the time of the operation of the air conditioner 72, but also when the engine 14 is stopped or the electric motor 16 is being driven.

On the other hand, the air conditioner 72 is operated in such a manner that the compressor 20 is rotated by the driving force of the electric motor 16. At this time, no large friction for rotating the driving shaft 14A of the engine 14 is applied to the electric motor 16, and therefore, the compressor 20 can be driven.

As described above, in the second embodiment as well, it is not necessary that the engine 14 be actuated when the air conditioner 72 is operated, thereby preventing deterioration of fuel consumption caused by starting the engine 14. Further, it is also not necessary to provide driving means used only for driving the compressor 20 in a state in which the engine 14 is stopped, and therefore, there is no need of an increase in parts for operating the air conditioner 72.

Further, as a method for reducing the load of the electric motor 16, there may be considered a method in which a clutch is provided between the driving shaft of the electric motor 16 and the driving shaft of the engine 14 to interrupt a large torque. However, the provision of such special parts is not necessary.

(Third Embodiment)

The method for driving the compressor 20 without starting the engine 14 while the engine 14 is stopped is not limited to the above-described first and second embodiments. A third embodiment will be hereinafter described with reference to FIG. 6.

Figure 6:
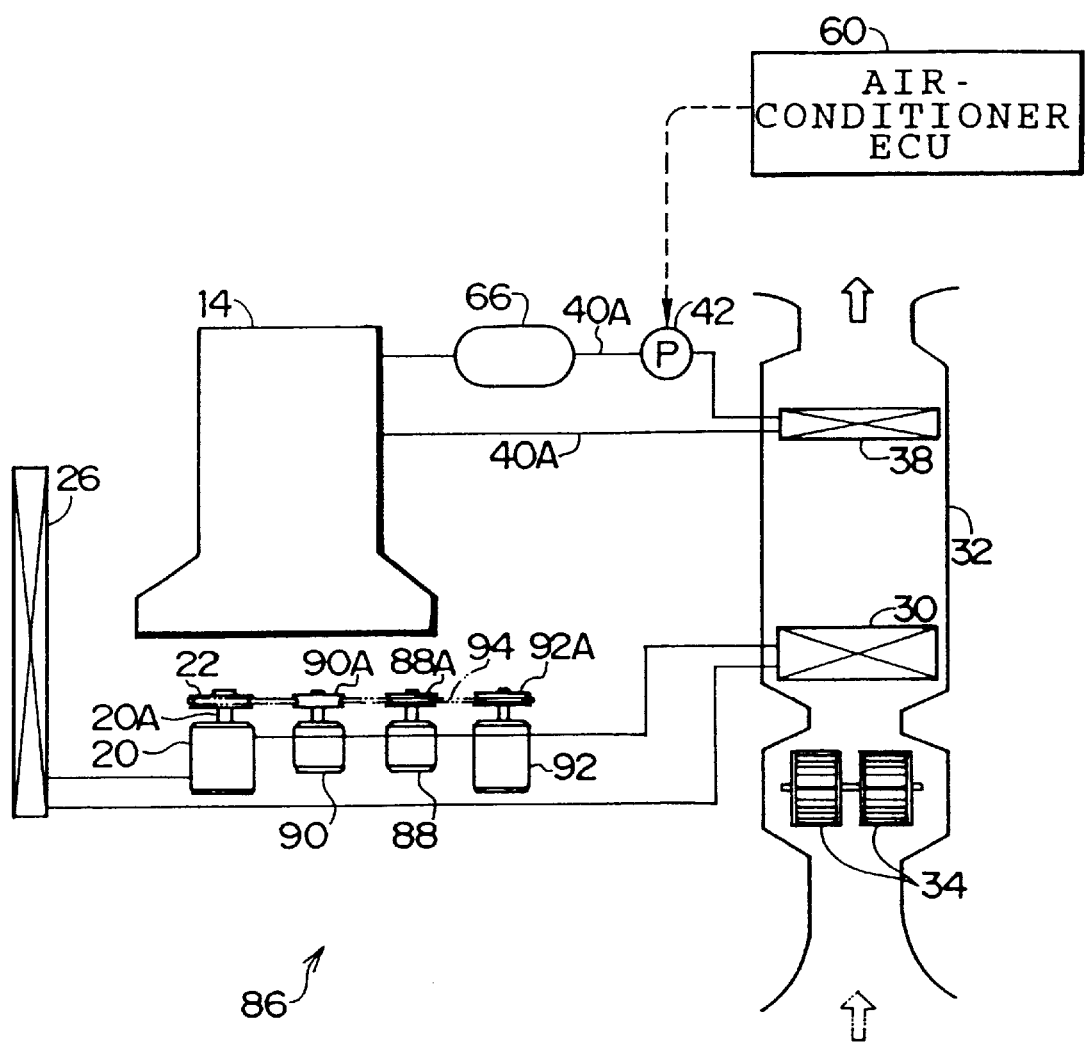
FIG. 6 is a schematic structural diagram of a hybrid car and an air conditioner according to a third embodiment.

Even in the case of a hybrid car, provision of a plurality of auxiliary machines such as a power steering pump is required, and even when the engine 14 has been stopped, it is necessary to drive these auxiliary machines. As shown in FIG. 6, the compressor 20 of the air conditioner 86 is, together with an alternator 88 and a power steering pump 90, driven by the driving force of an auxiliary machine motor 92.

Namely, a V belt 94 is entrained between a pulley 92A mounted to a driving shaft of the auxiliary machine motor 92, a pulley 88A mounted to a driving shaft of the alternator 88, a pulley 90A mounted to a driving shaft of the power steering pump, and a pulley 22 of the compressor 20, and the compressor 20 is rotated by the driving force of the auxiliary machine motor 92.

In the above-described structure as well, even when the engine 14 has been stopped, the compressor 20 can be driven without starting the engine 14. Further, a plurality of auxiliary machines are driven concurrently without providing driving means used only for driving the compressor 20, and therefore, it is not necessary to provide separate driving means for driving not only the compressor 20 but also the auxiliary machines.

Further, the alternator 88 is driven by the auxiliary machine motor 92 so as to allow the generation of a voltage different from that of the electric power for driving the electric motor 16. Usually, the working voltage of the electric motor 16 is set at a high value (for example, about 288V) because the electric motor 16 requires a large driving force. For this reason, it is necessary that the electric motor 16 be transformed to a suitable voltage (for example, 12V) using a DC/DC converter or the like so as to operate devices such as the air-conditioner ECU 60 and the like. On the other hand, electric power of this voltage (12V) can be directly generated by providing the alternator 88, and therefore, an effect that an expensive DC/DC converter becomes unnecessary is obtained, and further, reduction in cost of the parts used for a hybrid car can be achieved.

(Fourth Embodiment)

Next, an example of an air conditioner for a vehicle using the auxiliary machine motor 92 will be described, as a fourth embodiment, with reference to FIGS. 7A, 7B, and 8. It should be noted that the basic structure of the fourth embodiment is the same as that of the above-described third embodiment, and that the same members as those of the third embodiment will be denoted by the same reference numerals, and a description thereof will be omitted.

Figure 7A:
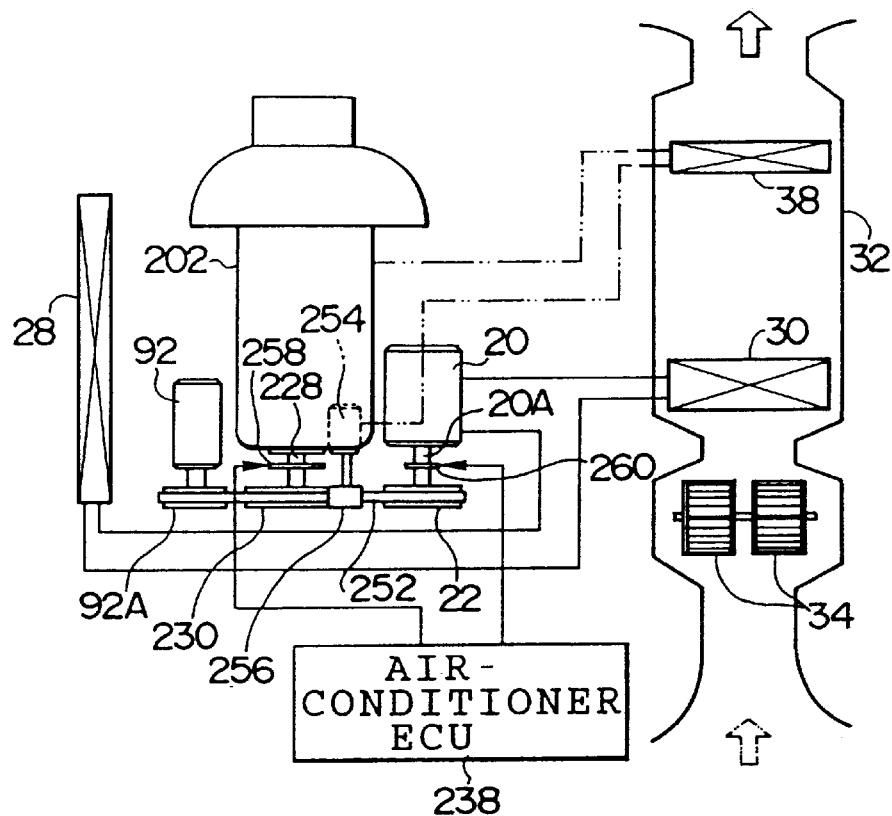
FIG. 7A is a schematic structural diagram of an air conditioner applied to a fourth embodiment.
Figure 7B:
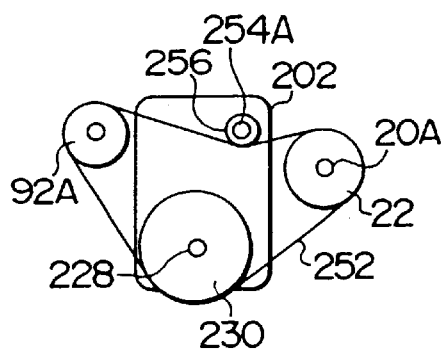
FIG. 7B is a schematic structural diagram which shows transmission of driving force based on FIG. 7A.
Figure 8:
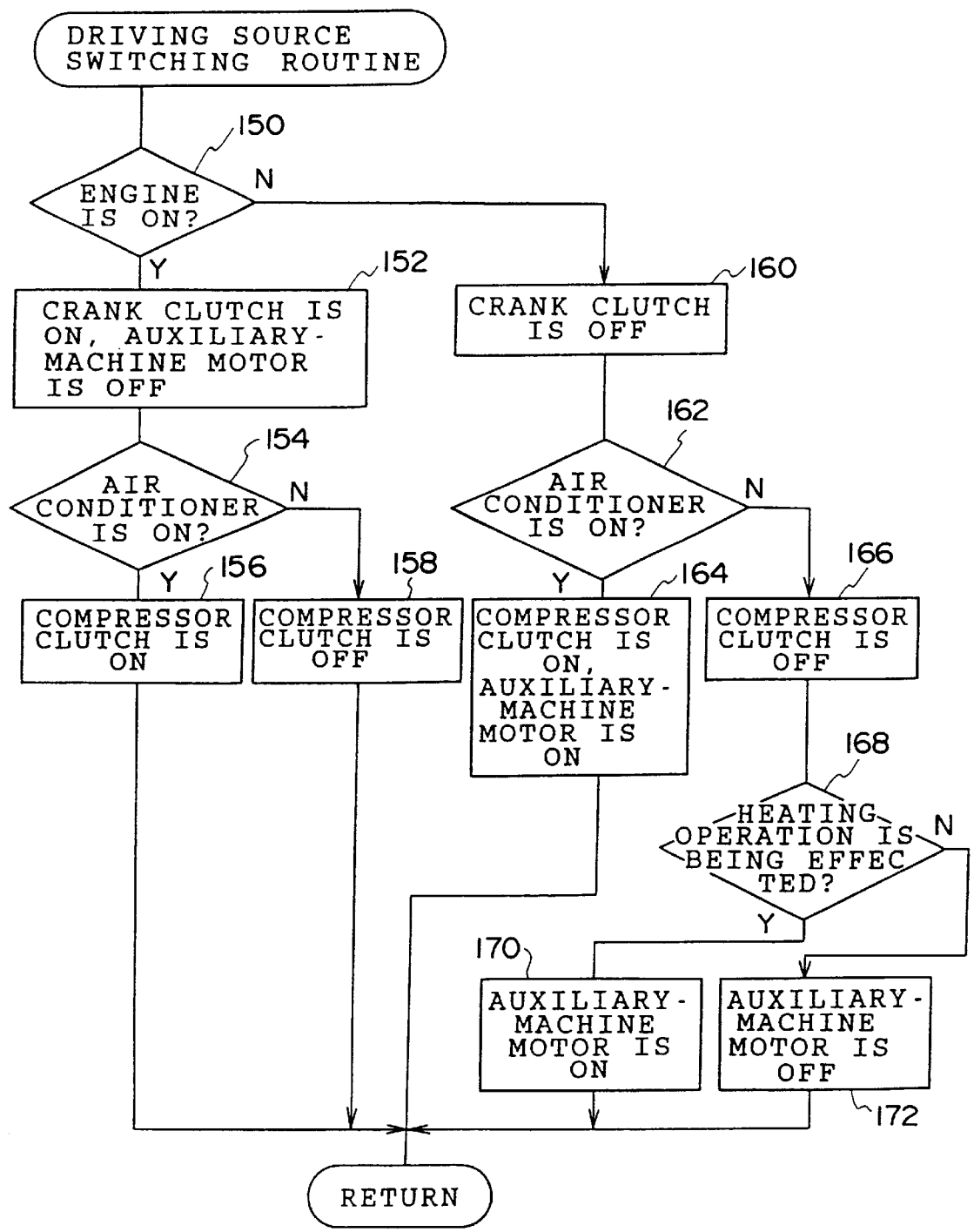
FIG. 8 is a flow chart which shows an example of a driving-source switching operation according to the fourth embodiment.

As shown in FIGS. 7A and 7B, the pulley 22 is mounted to the driving shaft 20A of the compressor 20 in an air conditioner 250. The auxiliary machine motor 92 is provided in the vicinity of an engine 202. A V belt 252 serving as a second driving force transmitting means is entrained between the pulley 92A of the auxiliary machine motor 92, the pulley 22 of the compressor 20, and a pulley 230 mounted to a crank shaft 228 of the engine 202.

Further, the air conditioner 250 includes a water pump 254 mounted to the engine 202 in place of the electrically operated pump 42. When the water pump 254 is driven, cooling water for the engine 202 is supplied to the heater core 38 so as to allow the vehicle interior to be heated.

The V belt 252 is also entrained onto a pulley 256 mounted to a driving shaft 254A of the water pump 254, and the water pump 254 can be driven by the driving force of the engine 202 or the driving force of the auxiliary machine motor 92. Meanwhile, other auxiliary machines such as the power steering pump 90 and the like (not shown in FIG. 7A) are also connected to the auxiliary machine motor 92, and when the pulley 92A is rotated by the driving force of the engine 202, the rotating force is also transmitted to these other auxiliary machines.

On the other hand, as shown in FIG. 7A, a crank clutch 258 serving as driving force interruption means is provided in the crank shaft 228 and a compressor clutch 260 is provided in the driving shaft 20A of the compressor 20. The crank clutch 258 separates the crank shaft 228 of the engine 202 and the pulley 230 from each other enabling the crank shaft 228 and the pulley 230 to be relatively rotatable. Further, the compressor clutch 260 separates the driving shaft 20A of the compressor 20 and the pulley 22 from each other enabling the driving shaft 20A and the pulley 22 to be relatively rotatable.

The crank clutch 258 and the compressor clutch 260 are each connected to an air-conditioner ECU 238, and the auxiliary machine motor 92 can also be driven by being controlled by the air-conditioner ECU 238.

The air-conditioner ECU 238 is provided to control the auxiliary machine motor 92, the crank clutch 258, and the compressor clutch 260 in accordance with the operating state of the air conditioner 250 and the operating state of the engine 202.

Next, with reference to the flow chart shown in FIG. 8, the switching of a driving source such as the compressor 20 when the air conditioner 250 is operated will be described.

In the flow chart, first, in step 150, it is ascertained whether the engine 202 is started (switched on). When the engine 202 is switched on (when the decision of step 150 is affirmative), the process proceeds to step 152, in which the crank clutch 258 is switched on (is connected) and the auxiliary machine motor 92 is stopped (is switched off). As a result, the V belt 252 is driven to rotate by the driving force of the engine 202 and other auxiliary machines connected to the water pump 254 or the auxiliary machine motor 92 are driven by the driving force of the engine 202.

In the subsequent step 154, it is ascertained whether the air conditioner 250 has been switched on, namely, whether the compressor 20 need to be driven. Here, when the air conditioner 250 has been switched on and the compressor 20 needs to be driven (when the decision of step 154 is affirmative), the process proceeds to step 156, in which the compressor clutch 260 is switched on. As a result, the driving force of the engine 202 is transmitted to the compressor 20 and the compressor 20 is thereby driven by the driving force of the engine 202.

Further, when the air conditioner 250 has not been switched on, namely, when the compressor 20 does not need to be driven (when the decision of step 154 is negative), the process proceeds to step 158, in which the compressor clutch 260 is switched off. As a result, the compressor 20 is not driven and the water pump 254 is driven, and therefore, heating is made possible. Further, other auxiliary machines connected to the auxiliary machine motor 92 are also driven by the driving force of the engine 202.

On the other hand, when the engine 202 has been stopped (when the decision of step 150 is negative), the process proceeds to step 160, in which the crank clutch 258 is switched off and the crank shaft 228 and the pulley 230 are separated from each other.

In the subsequent step 162, it is ascertained whether the air conditioner 250 has been switched on. When the air conditioner 250 has been switched on (when the decision of step 162 is affirmative), the process proceeds to step 164, in which the compressor clutch 260 is switched on and the auxiliary machine motor 92 is driven (switched on). As a result, the driving force of the auxiliary machine motor 92 is transmitted to the compressor 20 and also to the water pump 254 and the air conditioner 250 is operated by the driving force of the auxiliary machine motor 92.

Further, when the air conditioner 250 has not been switched on (when the decision of step 162 is negative), the process proceeds to step 166, in which the compressor clutch 260 is switched off. In the subsequent step 168, it is ascertained whether the heating operation is being effected, i.e., whether the heating operation is to be effected.

When the heating operation is effected (when the decision of step 168 is affirmative), the process proceeds to step 170, in which the auxiliary machine motor 92 is driven. As a result, the driving force of the auxiliary machine motor 92 is transmitted via the V belt 252 to the water pump 254 and cooling water of the engine 202 is supplied to the heater core 38. At this time, the crank clutch 258 and the compressor clutch 260 are each switched off, and therefore, there is no possibility of an unnecessary load being applied to the auxiliary machine motor 92.

Meanwhile, when the heating for the vehicle interior is not effected (when the decision of step 168 is negative), the process proceeds to step 172, in which the auxiliary machine motor 92 is left stopped. At this time, if it is necessary to operate other auxiliary machines connected to the auxiliary machine motor 92, the auxiliary machine motor 92 may be operated.

As described above, in the air conditioner 250 applied to the fifth embodiment as well, it is not necessary to use a motor used only for driving the compressor 20 and also not necessary to start the engine 202, thereby preventing deterioration of fuel consumption which is caused due to the engine 202 driving the compressor 20. Further, it is not necessary to provide the electrically operated pump 42 which is used to supply cooling water to the heater core 38 for the heating operation, and therefore, reduction in the number of parts and reduction in costs can be achieved.

Further, even if a hybrid car is temporarily stopped by reason of waiting for a traffic light or loading and unloading, and further, the engine 202 is stopped, air conditioning for the vehicle interior by the auxiliary machine motor 92 becomes possible.

In recent years, it has become possible for the engine to be stopped when a vehicle stops temporarily (short-time stopping) from the standpoint of fuel problems or environmental issues. However, even in this case, it is not necessary to stop the air conditioning for the vehicle interior. The same is not limited to the hybrid car, and can also be applied to a general vehicle having no electric motor serving as a driving source for a running operation.

Figure 7C:
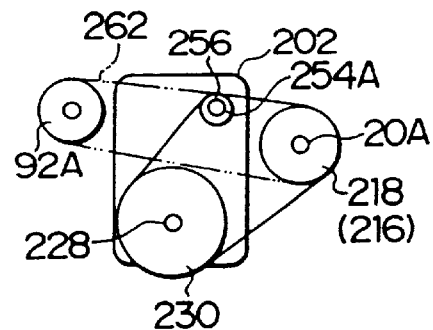
FIG. 7C is a schematic structural diagram which shows another example of transmission of driving force, which is different from that in FIG. 7B.

Meanwhile, the transmission of driving force to the compressor 20 and the switching of a driving source are not limited to the aforementioned. For example, as shown in FIG. 7C, with the double pulley clutch 206 being used in the driving shaft 20A of the compressor 20, a V belt 262 may be entrained between the pulley 216 and the pulley 92A of the auxiliary machine motor 92 and a V belt 264 may be entrained between the other pulley 218, a pulley 230, and a pulley 256.

As a result, when the air conditioner 250 is operated, it suffices that the double pulley clutch 206 be switched on at the time of operation (including a heating operation) of the air conditioner 250 using the auxiliary machine motor 92. Further, when the air conditioner 250 is not operated, so long as the double pulley clutch 206 is switched off, only the other auxiliary machines can be driven by the auxiliary machine motor 92 as occasion demands.

Further, in the sixth embodiment, the air-conditioner ECU 238 is used as the control means. However, the crank clutch 258, the compressor clutch 260, and the auxiliary machine motor may be each controlled by the engine ECU. Alternatively, a controller used only for these devices may be provided.

Meanwhile, in each embodiment of the present invention, the description given was that for a hybrid car, but the present invention can also be applied to vehicles of various structures, each traveling by the driving force of an engine without using an electric motor. In a vehicle which travels using an engine as a driving source, a so-called economy running system has been proposed in which the engine is stopped when the vehicle stops so as to improve fuel consumption and also inhibit emission of exhaust gas. In the case of using the economy running system, when the engine is stopped, driving of the compressor is also stopped. At this time, when the present invention is applied, the vehicle interior can be maintained in a comfortable air-conditioned state without stopping air conditioning in the vehicle interior.

In this case, for example, an alternator/starter motor can be used in place of the electric motor. The alternator/starter motor operates as a starter motor at the time of starting the engine, and during the operation of the engine, it operates as an alternator which generates power by the driving force of the engine.

As a result, when the engine is operated to allow a running operation, air conditioning for the vehicle interior can be carried out by driving the compressor while effecting power generation/charging by the alternator/starter motor.

On the other hand, when driving of the engine is stopped by stopping the vehicle, the engine and the alternator/starter motor are separated from each other and the alternator/starter motor is driven as the electric motor. As a result, the driving force of the alternator/starter motor is transmitted to the compressor without being transmitted to the engine, thereby allowing air conditioning for the vehicle interior using the compressor.

As a result, even when the engine 14 is in a stopped state, air conditioning for the vehicle interior can be effected by driving the compressor 20.

INDUSTRIAL APPLICABILITY

The above-described present invention allows air-cooling and heating in which the power of an engine is efficiently utilized. Further, the present invention also allows the driving of a compressor by an electric motor without starting an engine and is useful as an air conditioner not only for a vehicle which travels by the driving force of the engine, but also for a hybrid car which travels by the driving force of the electric motor in addition to that of the engine.

What is claimed is:

1. An air conditioner for a hybrid car, which is provided in a hybrid car equipped with an engine and an electric motor for running and which air conditions a vehicle interior by a refrigerating cycle formed to include a compressor and an evaporator, comprising:

driving shafts provided respectively in the engine and in the electric motor;

an output shaft connected to the driving shafts of the engine and the electric motor and rotated synchronously with a driving source which is one of the engine and the electric motor;

load reduction means for reducing the driving load of said output shaft which rotates integrally with the driving shaft of the engine when the electric motor is driven; and driving force transmitting means which connects said output shaft and the driving shaft of the compressor to transmit the driving force of said output shaft to the compressor.

2. An air conditioner for a hybrid car according to claim 1, wherein said load reduction means is valve opening means for opening one of an intake valve and an exhaust valve while the engine is stopped.

3. An air conditioner for a hybrid car, which is provided in a hybrid car equipped with an engine and an electric motor for running and which air conditions a vehicle interior by a refrigerating cycle formed to include a compressor and an evaporator, comprising:

an auxiliary-machine motor which drives a plurality of auxiliary machines provided in the hybrid car;

second driving force transmitting means which can transmit the driving force of the engine and the driving force of said auxiliary-machine motor to the plurality of auxiliary machines and also to the driving shaft of the compressor;

driving force interrupting means which separates the driving shaft of the engine and said second driving force transmitting means from each other; and control means which separates the driving shaft of the engine and said second driving force transmitting means from each other by said driving force interrupting means when the engine is stopped and allows the plurality of auxiliary machines including the compressor to be driven by said auxiliary-machine motor.

* * * * *

UNITED STATES PATENT AND TRADEMARK OFFICE
CERTIFICATE OF CORRECTION

PATENT NO.    : 6,427,472 B1
DATED         : August 6, 2002
INVENTOR(S)   : Nakagawa et al.

It is certified that error appears in the above-identified patent and that said Letters Patent is hereby corrected as shown below:

<u>Title page,</u>
Item [56], References Cited, add the following U.S. and FOREIGN PATENT DOCUMENTS:

-- U.S. PATENT DOCUMENTS

| | | | |
|---|---|---|---|
| 2,865,558 | 12/1958 | Schemmel............... | 243/62 |
| 3,941,012 | 3/1976  | Mayer..................... | 74/661 |
| 3,990,505 | 11/1976 | Davenport................. | 165/43 |
| 4,587,936 | 5/1986  | Matsuura et al. ........... | 123/315 |
| 5,441,122 | 8/1995  | Yoshida................... | 180/65.2 |
| 5,553,662 | 9/1996  | Longardner et al......... | 165/202 |
| 5,896,750 | 4/1999  | Karl....................... | 62/236 -- |

-- FOREIGN PATENT DOCUMENTS

| | | |
|---|---|---|
| 0645271 | 3/1995 | European Pat. Office |
| 0715979 | 6/1996 | European Pat. Office -- |

Signed and Sealed this

Twenty-first Day of October, 2003

JAMES E. ROGAN
*Director of the United States Patent and Trademark Office*

(12) EX PARTE REEXAMINATION CERTIFICATE (5315th)
United States Patent
Nakagawa et al.

(10) Number: US 6,427,472 C1
(45) Certificate Issued: Mar. 28, 2006

(54) AIR CONDITIONER FOR A VEHICLE

(75) Inventors: Tadashi Nakagawa, Nishikamo-gun (JP); Takayoshi Matsuno, Okazaki (JP)

(73) Assignee: Toyota Jidosha Kabushiki Kaisha, Toyota (JP)

Reexamination Request:
No. 90/006,695, Jul. 3, 2003

Reexamination Certificate for:
Patent No.: 6,427,472
Issued: Aug. 6, 2002
Appl. No.: 09/282,422
Filed: Mar. 31, 1999

Certificate of Correction issued Oct. 21, 2003.

Related U.S. Application Data

(63) Continuation of application No. PCT/JP97/03505, filed on Oct. 1, 1997.

(30) Foreign Application Priority Data

Oct. 1, 1996 (JP) .................................. 8-261016
Jan. 16, 1997 (JP) .................................. 9-005709

(51) Int. Cl.
*B60H 1/32* (2006.01)

(52) U.S. Cl. ................... 62/430; 62/229; 62/323.1; 165/42

(58) Field of Classification Search .............. 62/430, 62/229, 323.1, 133, 134, 243, 244; 165/42, 165/43
See application file for complete search history.

(56) References Cited

U.S. PATENT DOCUMENTS

| | | | | |
|---|---|---|---|---|
| 2,865,558 A | 12/1958 | Schemmel | ............. | 230/49 |
| 2,962,873 A | 12/1960 | Anderson | ............. | 62/180 |
| 3,941,012 A | 3/1976 | Mayer | ............. | 74/661 |
| 3,990,505 A | 11/1976 | Davenport | ............. | 165/43 |
| 4,587,936 A | 5/1986 | Matsuura et al. | ............. | 123/315 |
| 5,277,038 A | 1/1994 | Carr | ............. | 62/434 |
| 5,441,122 A | 8/1995 | Yoshida | ............. | 180/65.2 |
| 5,497,941 A | 3/1996 | Numazawa et al. | ............. | 237/2 A |
| 5,553,662 A | 9/1996 | Longardner et al. | ............. | 165/202 |
| 5,635,805 A | 6/1997 | Ibaraki et al. | ............. | 318/139 |
| 5,755,303 A | 5/1998 | Yamamoto et al. | ............. | 180/65.2 |
| 5,896,750 A | 4/1999 | Karl | ............. | 62/236 |

FOREIGN PATENT DOCUMENTS

| | | |
|---|---|---|
| EP | 0645271 A2 | 3/1995 |
| EP | 0715979 A1 | 6/1996 |
| EP | 0645271 B1 | 11/1997 |
| EP | 0715979 B1 | 2/2002 |
| JP | 58-211906 | 12/1983 |
| JP | 59-114106 | 7/1984 |
| JP | 61-150818 | 7/1986 |
| JP | 63-9023 | 1/1988 |
| JP | 63-35843 | 9/1988 |
| JP | 3-266765 | 11/1991 |
| JP | 4-126628 | 4/1992 |
| JP | 5-328521 | 12/1993 |
| JP | 6-4344 | 1/1994 |
| JP | 6-156062 | 6/1994 |
| JP | 6-27766 | 7/1994 |
| JP | 6-286459 | 10/1994 |
| JP | 7-21845 | 5/1995 |
| JP | 08-079915 | 3/1996 |
| JP | 8-98318 | 4/1996 |
| JP | 8-142642 | 6/1996 |
| JP | 09-076775 | 3/1997 |
| JP | 10-084603 | 3/1998 |

*Primary Examiner*—Chen-Wen Jiang

(57) ABSTRACT

There is provided an air conditioner for a vehicle, which comprises a refrigerating cycle having a compressor (20), a water cooling cycle formed by a radiator (36) and a heat storage tank (50), which are switched by passage switching valves (46) and 48), and a water heating cycle formed by a heater core (38) and the heat storage tank (50). As a result, when an engine is being driven, heat for cooling or heating is stored in the heat storage tank (50) by the water cooling cycle or the water heating cycle, and when an engine (14) is in a stopped state, the heat stored in the heat storage tank (50) is used to allow cooling or heating.

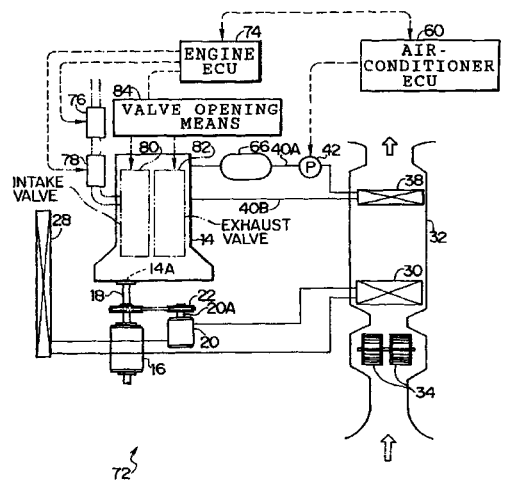

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 47–58:

When the engine 14 has been started, the driving force of the engine 14 is transmitted via the V belt 26 to the compressor 20 and the driving shaft 20A of the compressor 20 is thereby rotated. As a result, the refrigerant compressed and discharged from the compressor 20 is supplied to the water-refrigerant heat exchanger [36] *52* and the water refrigerant circulated in the water-refrigerant heat exchanger [36] *52* is cooled. The water refrigerant cooled by the water-refrigerant heat exchanger [36] *52* is transferred to the heat storage tank 50 to cool the heat accumulating material within the heat storage tank 50. As a result, heat for a cooling operation is stored in the heat storage tank 50.

Column 9, line 67 to column 10, line 5:

As shown in FIG. 5, an air conditioner 72 applied to the [fourth] *second* embodiment allows heating by using heat of the engine 14 when the engine 14 is driven. Further, when the engine 14 is stopped, heating can be effected by using heat of the engine 14 stored in the heat storage tank 66 when the electrically operated pump 42 is actuated to drive the engine 14.

AS A RESULT OF REEXAMINATION, IT HAS BEEN DETERMINED THAT:

Claims 1 and 3 are determined to be patentable as amended.

Claim 2, dependent on an amended claim, is determined to be patentable.

1. An air conditioner for a hybrid car, which is provided in a hybrid car equipped with an engine and an electric motor for running and which air conditions a vehicle interior by a refrigerating cycle formed to include a compressor and an evaporator, comprising:

driving shafts provided respectively in the engine and in the electric motor;

an output shaft connected to the driving shafts of the engine and the electric motor and rotated synchronously with a driving source which is one of the engine and the electric motor;

[load reduction means for reducing the driving load of said output shaft which rotates integrally with the driving shaft of the engine when the electric motor is driven; and]

driving force transmitting means which connects said output shaft and the driving shaft of the compressor to transmit the driving force of said output shaft to the compressor; *and*

*load reduction means for reducing a rotation load of the driving shaft of the engine, which driving shaft is rotated integrally with said output shaft which is rotated by the driving force of the electric motor to drive the compressor when the engine is stopped.*

3. An air conditioner for a hybrid car, which is provided in a hybrid car equipped with an engine and an electric motor for running[and which], *wherein said hybrid car is run by a driving force of the engine without using the electric motor when the engine is operated, and which runs by a driving force of the electric motor when the engine is stopped, wherein the air conditioner* air conditions a vehicle interior by a refrigerating cycle formed to include a compressor and an evaporator, comprising:

an auxiliary-machine motor, *other than the electric motor for running,* which drives a plurality of auxiliary machines provided in the hybrid car;

second driving force transmitting means which can transmit the driving force of the engine and [the] *a* driving force of said auxiliary-machine motor to the plurality of auxiliary machines and also to the driving shaft of the compressor;

driving force interrupting means which separates the driving shaft of the engine and said second driving force transmitting means from each other; and control means *which transmits the driving force of the engine to the auxiliary machines and the compressor by controlling the second driving force transmitting means when the engine is operated and allows the plurality of auxiliary machines including the compressor to be driven by the engine and* which separates the driving shaft of the engine and said second driving force transmitting means from each other by *controlling* said driving force interrupting means when the engine is stopped and allows the plurality of auxiliary machines including the compressor to be driven by said auxiliary-machine motor.

\* \* \* \* \*